(12) United States Patent
Klein et al.

(10) Patent No.: US 11,368,505 B2
(45) Date of Patent: Jun. 21, 2022

(54) DYNAMIC VARIANT LIST MODIFICATION TO ACHIEVE BITRATE REDUCTION

(71) Applicant: Disney Enterprises, Inc., Burbank, CA (US)

(72) Inventors: Eric R. Klein, Astoria, NY (US); William B. May, Jr., Sunnyvale, CA (US); Jeffrey Edwin Grubb, South Amboy, NJ (US); Aashish J. Shah, Jersey City, NJ (US); Eric C. Friedrich, North Easton, MA (US); Joseph S. Rice, Berkeley, CA (US); Joseph A. Inzerillo, Brooklyn, NY (US); Christopher J. Zucker, Brooklyn, NY (US); Joseph C. Hart, Maplewood, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/021,849

(22) Filed: Sep. 15, 2020

(65) Prior Publication Data

US 2022/0086207 A1    Mar. 17, 2022

(51) Int. Cl.
*H04L 65/613* (2022.01)
*H04L 65/60* (2022.01)

(52) U.S. Cl.
CPC ........ *H04L 65/4092* (2013.01); *H04L 65/601* (2013.01); *H04L 65/607* (2013.01)

(58) Field of Classification Search
CPC .. H04L 65/4092; H04L 65/607; H04L 65/601
See application file for complete search history.

(56) References Cited

U.S. PATENT DOCUMENTS

| | | | | |
|---|---|---|---|---|
| 2014/0280781 | A1* | 9/2014 | Gregotski | H04L 67/06 709/219 |
| 2014/0344575 | A1* | 11/2014 | Saremi | H04L 63/061 713/168 |
| 2014/0359081 | A1* | 12/2014 | Van Deventer | H04N 21/6587 709/219 |
| 2015/0201042 | A1* | 7/2015 | Shah | H04L 65/4084 709/219 |
| 2016/0065637 | A1* | 3/2016 | O'Malley | H04L 67/22 709/231 |
| 2016/0094468 | A1* | 3/2016 | May, Jr | H04N 21/4424 709/231 |
| 2016/0294898 | A1* | 10/2016 | Wheelock | H04L 65/602 |
| 2017/0041355 | A1* | 2/2017 | Ramamurthy | H04L 67/02 |
| 2017/0085933 | A1* | 3/2017 | Czeck, Jr | H04N 21/26258 |
| 2017/0169039 | A1* | 6/2017 | Brown | H04L 65/1083 |

(Continued)

OTHER PUBLICATIONS

Disclosure of Prior Use Statement for U.S. Appl. No. 17/021,849, Entitled "Dynamic Variant List Modification to Achieve Bitrate Reduction", filed Sep. 15, 2020.

*Primary Examiner* — Oanh Duong
(74) *Attorney, Agent, or Firm* — Patterson + Sheridan, LLP

(57) ABSTRACT

Techniques for improved media streaming are provided. A request for a variant list for streaming media content is received from a requesting entity, where the request includes a predefined flag. A set of predefined rules corresponding to the predefined flag is identified. The variant list is pruned based on the set of predefined rules, and the pruned variant list is transmitted to the requesting entity.

20 Claims, 7 Drawing Sheets

(56) References Cited

U.S. PATENT DOCUMENTS

| | | | |
|---|---|---|---|
| 2017/0223361 A1* | 8/2017 | Blomqvist | H04N 21/8547 |
| 2018/0020036 A1* | 1/2018 | Ramamurthy | H04L 65/607 |
| 2018/0020246 A1* | 1/2018 | Harrison | H04L 65/4069 |
| 2018/0063213 A1* | 3/2018 | Bevilacqua-Linn | H04N 21/2387 |
| 2018/0084018 A1* | 3/2018 | Arky | H04W 4/06 |
| 2018/0159916 A1* | 6/2018 | Bowen | H04N 21/6125 |
| 2018/0160159 A1* | 6/2018 | Asarikuniyil | H04N 21/2187 |
| 2018/0205742 A1* | 7/2018 | Vinukonda | H04L 63/107 |
| 2019/0037283 A1* | 1/2019 | Krauss | H04N 21/8106 |
| 2019/0069036 A1* | 2/2019 | Afshar | H04N 21/2401 |
| 2019/0207996 A1* | 7/2019 | Sehgal | H04N 21/234 |
| 2019/0297370 A1* | 9/2019 | Afshar | H04L 65/604 |
| 2019/0327505 A1* | 10/2019 | Schwimmer | H04L 65/80 |
| 2020/0045351 A1* | 2/2020 | Paixao | H04L 63/1458 |
| 2020/0213640 A1* | 7/2020 | Watson | H04N 21/8456 |

\* cited by examiner

DYNAMIC VARIANT LIST MODIFICATION TO ACHIEVE BITRATE REDUCTION

BACKGROUND

Streaming services (e.g., video streams, audio streams, or multimedia streams) have become increasingly common and desired by a wide variety of users. Streaming content enables users to receive the multimedia they desire at the time they desire/need it, rather than downloading it ahead of time. That is, rather than force users to wait long periods of time for large downloads (e.g., an entire movie), which also forces users to store large amounts of data, streaming enables the user to fetch smaller segments of a larger video on an as-needed basis (e.g., just before the segment begins).

To improve streaming services, Adaptive Bitrate Streaming (ABR) has been developed. ABR is predicated on providing multiple streams (often referred to as variants) at varying bitrates, enabling clients to dynamically select variants based on network conditions and other factors. These variants are encoded using various techniques to produce a set of target output bitrates, allowing client devices to select the target bitrate they prefer. Although allowing clients to adapt from one variant to another as network conditions change can improve the experience, clients are typically able to select whatever variant they desire, without restriction. This can lead to reduced performance and unnecessary harm to the streaming system or the broader network.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
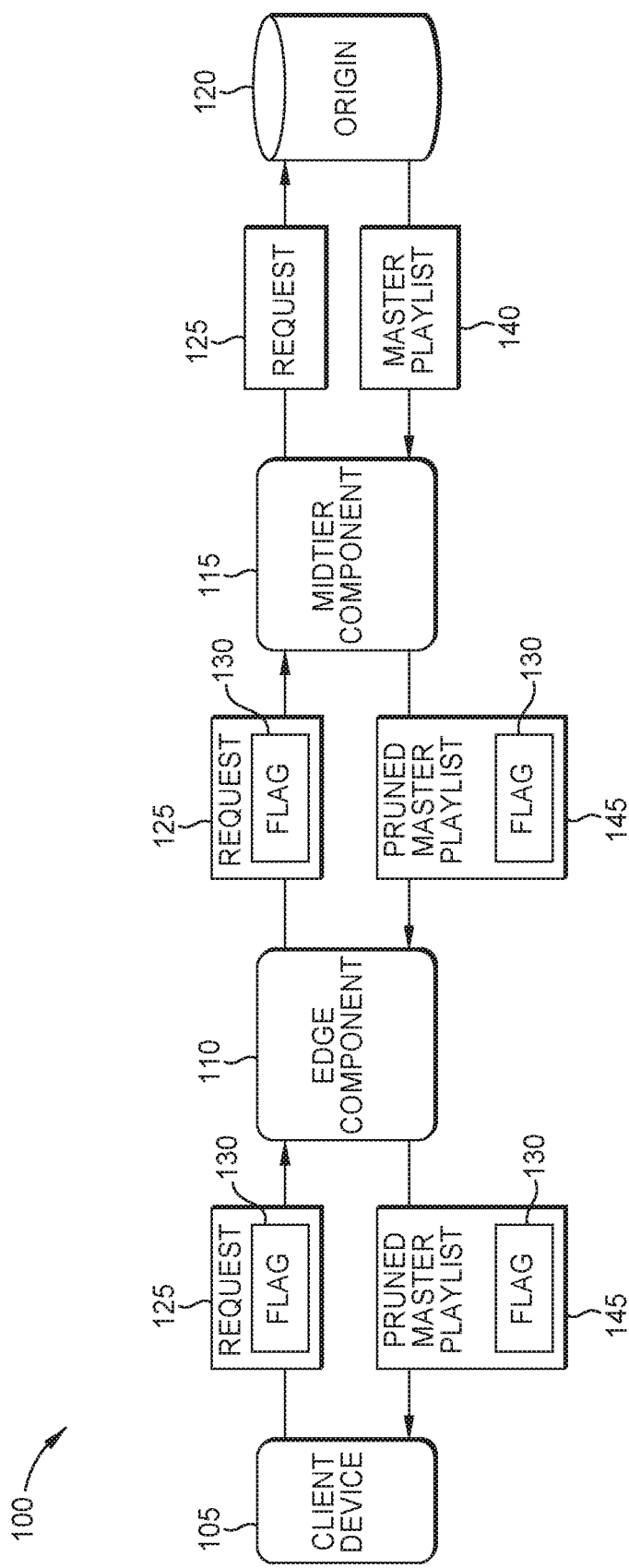
FIG. 1 depicts a workflow for playlist retrieval and modification, according to some embodiments disclosed herein.

Embodiments of the present disclosure provide techniques for dynamic modification of playlists or manifests in streaming environments. The techniques described herein enable reduced resource usage, including reduced network bandwidth used in desired locales. In at least one embodiment, the techniques described herein can be used to ensure that client devices are only offered variants that the device can support/output. In some embodiments, an origin or source can provide media to client devices via one or more streaming components. For example, an origin may include a database or other store of media content (often delineated into individual segments which are requested/transmitted separately). In order to identify and request any particular media content (including segments or portions of media), client devices refer to playlists (also referred to as manifests in some embodiments) that are provided by the origin.

In an embodiment, a master playlist can specify the set of media variants that are available, as well as the location (e.g., an address or path) where each such variant can be found. For example, a master playlist may list each resolution that is available for given media content, along with a location or address where each media variant can be downloaded. In one embodiment, a master playlist (also referred to as manifest in some embodiments) generally includes a comprehensive list of available media content (including variants of each piece of media). In contrast, a media playlist or manifest generally corresponds to a particular variant, and specifies the location of each segment of the variant.

In embodiments, the client device can reference the playlist in order to select and retrieve the desired variant(s). Although some aspects of the present disclosure utilize terms such as "master playlist" and "manifest" as examples for conceptual clarity, embodiments of the present disclosure can be applied to any variant list or other list of variants or media streams (e.g., adaptive bitrate streams) that are available to clients. In some embodiments it is desirable to limit the set of variants that are presented to the client devices.

For example, under some conditions (such as capacity limitations, requests from governmental or other priority entities, and the like) the capacity of the network (particularly in the "last mile" before reaching the clients) may become constrained. As a result of the reduced capacity, the performance of streaming/playback may be reduced, thereby impacting the quality of experience for end users. Some systems attempt to solve this problem using adaptive bitrate delivery paradigms. However, such approaches have limited effectiveness in a wide variety of realistic deployments. When excessive bandwidth constraint is needed, or there is a need for proactive bandwidth limiting, a more proactive solution is desired. Embodiments of the present disclosure provide techniques to dynamically modify playback scenarios proactively (e.g., adjusting the available variants that are presented to each end user's device).

In some embodiments, rather than rely on a single static master playlist that lists all available variants, the system can dynamically modify or prune the master playlist (or utilize other playlists) with reduced options as needed. For example, when reduced bandwidth is available, the system may refrain from offering high-bitrate variants to client devices. In some embodiments, the system can target these modifications towards specific locales or "last mile" networks (e.g., particular autonomous system numbers (ASNs) or Internet service providers (ISPs)) in order to respond to changing conditions at each locale. Similarly, in some embodiments, the system retains flexibility to deploy such modifications across different global regions and with different restriction options (e.g., standard definition (SD) only, high definition (HD) only, only variants without surround sound, and the like).

In some embodiments, once a playlist has been received and playback has begun, the user devices do not request additional playlists (or check for updates to the playlist). In some other embodiments, each user device is generally configured to request an updated master playlist periodically (e.g., every ten seconds) or upon predefined criteria. In this way, the updated master playlists can be pushed out rapidly and efficiently. The techniques described herein provide adaptability and dynamic approaches that ensure that creating multiple different playlists for each specific scenario is scalable and rapid.

In some embodiments, to adjust the media playback experience (e.g., reducing the bitrate for a particular region) while maintaining cache efficiency for smooth global delivery to all end users, the system utilizes a set of predefined flags (e.g., keywords) and associated rules. For example, client devices within the targeted region may send manifest requests that include a predefined flag with the request. These manifest requests may be master playlist links that include flags and may be provided to the client devices by a distribution system that selects the flags and generates the links. Alternatively, the flags may be selected or generated by the client devices. This flag causes the upstream component(s) to return modified or pruned playlists that are created based on the flag. This allows the system to target reduced playlists/variants to particular clients as needed, according to any number of criteria.

FIG. 1 depicts a workflow 100 for playlist retrieval and modification, according to some embodiments disclosed herein. In the illustrated embodiment, the system includes a Client Device 105, an Edge Component 110, a Midtier Component 115, and an Origin 120. Although depicted as discrete components, in some embodiments, the various devices and components may be combined, or other components may be present in the workflow 100. For example, although a discrete Edge Component 110, Midtier Component 115, and Origin 120 are illustrated for conceptual clarity, in some embodiments, the operations of each may be combined or distributed across any number of components. Similarly, although a single Client Device 105, Edge Component 110, Midtier Component 115, and Origin 120 are depicted, in embodiments, there may be any number of each component.

In the illustrated embodiment, the end user uses the Client Device 105 to consume media. For example, the Client Device 105 may correspond to a smart television, console, laptop device, computer, smart phone, and the like. In some embodiments, the Client Device 105 executes one or more applications configured to interface with the streaming system in order to request and output media segments. For example, the operator of the Origin 120 may distribute an application that is configured to interface with the Origin 120 (potentially through one or more intermediaries) to stream content available in the Origin 120.

The Edge Component 110 generally acts as an intermediary for the Client Device 105, acting as the first component that receives client requests, as well as the final component that returns the requested material to the clients. Similarly, the Midtier Component 115 generally acts as the intermediary for the Origin 120. Using such a hierarchical structure can enable broader scalability in the system (e.g., with each Edge Component 110 serving multiple Client Devices 105, each Midtier Component 115 serving multiple Edge Components 110, and the Origin 120 serving a number of Midtier Components 115). Although depicted as discrete components, in some embodiments, the Edge Component 110 and Midtier Component 115 may be combined. In the illustrated embodiment, the Origin 120 acts as the source for media segments and playlists in the system.

As discussed above, to identify available media content (including which variants are available), the Client Device 105 (or a streaming application on the Client Device 105) transmits a Request 125 for a master playlist. In the illustrated embodiment, the Request 125 includes a Flag 130 that generally indicates the restriction(s) that apply to the Request 125 or Client Device 105. For example, the Flag 130 may indicate that the streaming system should refrain from offering any HD variants to the requesting Client Device 105. In embodiments, any number of Flags 130 (or any number of different values for the Flag 130) may be utilized to convey the limitations to be used.

In some embodiments, each Flag 130 is associated with a set of predefined rules that are used by the streaming system to modify the master playlist before returning it to the request Client Device 105. In some embodiments, the Flag 130 is a keyword included in the request. For example, suppose the Request 125 specifies a path where the master playlist is located (e.g., "Origin/path/playlist.m3u8"). In one embodiment, the Flag 130 is a modification to the path (e.g., "Origin/FLAG/path/playlist.m3u8"). In another embodiment, the Flag 130 is included as a keyword or parameter appended to the path (e.g., "Origin/path/playlist.m3u8?playlist=FLAG").

In at least one embodiment, the Client Device 105 includes the Flag 130 based on a configuration of the device or streaming application. For example, the Client Device 105 (or the streaming application on the Client Device 105) may be configured to insert one or more Flags 130 when instructed to do so (e.g., by the Origin 120 or another entity), when certain conditions exist (e.g., specified network conditions), when in certain geographic locations (e.g., locations with network bandwidth constraints), and the like. In this way, the system dynamically adjusts the playlists that are provided to each Client Device 105, based on the Flag(s) 130 each Client Device 105 uses. For example, Client Devices 105 may utilize the Flag 130 because they are located in a defined area (or communicate via a particular ISP or other network) that is currently associated with reduced capacity.

In some embodiments, the Flags 130 are controlled by the distribution system that provides the master playlist link to each Client Device 105. The client device then uses the link to request the master playlist indicated by the (flagged) link. That is, in one such embodiment, when a Client Device 105 requests a master playlist, the distribution system (e.g., the Origin 120 or the Midtier Component 115) evaluates the Client Device 105 (e.g., its type, location, associated users, and the like) against a set of predefined rules, and returns a link to the master playlist (e.g., a uniform resource locator (URL)) with any appropriate Flag(s) 130 included. For example, in one embodiment, predefined rules may be provided (e.g., by an administrator) instructing the Midtier Component 115 to utilize certain flags (and thereby restrict or filer available variants) when criteria relating to bandwidth or location are satisfied. As the Midtier Component 115 serves multiple client devices, it may have a broader view of the network and therefore provide a better understanding of the bandwidth restrictions in given locales. That is, while each Client Device 105 may know its own bandwidth, the Midtier Component 115 can respond to broader network changes.

In various embodiment, the Midtier Component 115 may utilize the flag(s) specified by any rules that are satisfied. In some embodiments, this includes including the flag for all Client Device 115 that satisfy the criteria (e.g., are located within the region or are associated with a particular network that is having bandwidth difficulties). In at least one embodiment, the Midtier Component 115 may utilize weighted percentages to dynamically reduce bandwidth across the system. For example, if a given locale is suffering bandwidth restrictions, the Midtier Component 115 may select some percentage of the clients in the region (randomly or semi-randomly) to utilize the flag (and therefore receive a reduced list of available variants). In embodiments, the Client Device 105 need not understand the modifications (e.g., filtering of one or more variants), and need not even know whether such filtering is occurring. The Client Device 105 need only use the provided link (which may have flags included) to retrieve the master playlist.

In the illustrated embodiment, upon receipt of the Request 125, the Edge Component 110 can determine whether the requested master playlist is available locally. For example, the Edge Component 110 may store the master playlist in a cache or other storage structure. In embodiments, the Edge Component 110 determines whether the Request 125 includes any Flags 130. If not, the Edge Component 110 determines that the original (full) master playlist is desired. If a Flag 130 is present, the Edge Component 110 can determine that the associated modified master playlist is requested. If the requested master playlist or modified master playlist is not available to the Edge Component 110 (e.g., not within the cache), the Edge Component 110 forwards the Request 125 and Flag 130 to the Midtier Component 115. In some embodiments, the cache at the Edge Component 110 is associated with a predefined timeout, such that any master playlist stored in the cache is considered "expired" when the time limit has passed. In such an embodiment, the Edge Component 110 may determine that the master playlist is not available even if it is still located in the cache, based on determining that the copy has expired.

As illustrated, the Midtier Component 115 similarly receives the Request 125 and evaluates it to identify any Flags 130. The Midtier Component 115 can then determine whether its local storage (e.g., a cache used by the Midtier Component 115) contains a copy of the requested master playlist (either the original master playlist, or a modified version generated based on the indicated Flag 130). If so, the Midtier Component 115 can simply return this requested master playlist to the Edge Component 110, which forwards it to the Client Device 105. If the master playlist is not available (or has expired, as discussed above), the Midtier Component 115 can forward the Request 125 to the Origin 120.

In the illustrated embodiment, the Midtier Component 115 first strips the Flag(s) 130 from the Request 125 prior to forwarding it to the Origin 120. As illustrated, the Origin 120 retrieves and returns the requested Master Playlist 140 to the Midtier Component 115. As illustrated, the Midtier Component 115 then modifies the Master Playlist 140 if needed (indicated by a Flag 130) to create a Pruned Master Playlist 145, which is returned to the Edge Component 110. Although illustrated as being created by the Midtier Component 115, in some embodiments, the Edge Component 110 receives the original Master Playlist 140 and creates the Pruned Master Playlist 145. In still another embodiment, the Origin 120 may generate the Pruned Master Playlist 145.

In some embodiments, to generate the Pruned Master Playlist 145, the Midtier Component 115 uses the Flag(s) 130 included in the original request to identify a set of predefined rules. These rules are then used to modify the Master Playlist 140. In embodiments, the rules specify any number and variety of conditions or criteria that are used to selectively remove (i.e., "prune") some sections (e.g., some variants) from the Master Playlist 140. For example, for a given Flag 130, the corresponding rules may specify to remove any variants above a particular resolution or bitrate. As a result, the Pruned Master Playlist 145 generally includes fewer variants than original Master Playlist 140. In an embodiment, when a variant is pruned (removed) from the Master Playlist 140, metadata associated with the pruned variant (e.g., the digital rights management (DRM) key identifier or reference, or the key itself) is pruned as well. In some embodiments, the Midtier Component 115 caches the Pruned Master Playlist 145, the original Master Playlist 140, or both for future use. This allows the Midtier Component 115 to respond to subsequent requests more rapidly (e.g., without transmitting a new request to the Origin 120).

In some embodiments, the rules used to create pruned playlists are created by users or administrators. In at least one embodiment, the system can learn over time, and generate new rules (or modify existing ones) based on historical conditions. Some embodiments of the present disclosure discuss removing (also referred to as filtering or pruning) variants from the playlist as a possible modification. In some embodiments, modifying the playlist can also include adding new variants to it when particular rules are satisfied and particular keywords are used. For example, the system may, by default, provide a master playlist that includes fewer than all available variants. When particular keywords are utilized, these additional variants may be added to the playlist and made available to client devices.

As illustrated, the Pruned Master Playlist 145 is returned with the original Flag 130 included. The Edge Component 110, upon receipt of the Pruned Master Playlist 145, can forward it to the requesting Client Device 105 (along with the Flag 130). In some embodiments, the Edge Component 110 can additionally cache the Pruned Master Playlist 145 locally, allowing the Edge Component 110 to respond more rapidly for any future requests that include the same Flag 130. In at least one embodiment, the Edge Component 110 can also receive and cache the original Master Playlist 140.

In this way, the Midtier Component 115 and Edge Component 110 can cache a number of distinct playlists including the original Master Playlist 140 and any number of Pruned Master Playlists 145, where each respective Pruned Master Playlist 145 was generated based on a respective Flag 130. Because the Pruned Master Playlist 145 has some variants selectively removed, the Client Device 105 can proceed to select a media variant from the Pruned Master Playlist 145 using existing logic. That is, the Client Device 105 can select the appropriate variant based on its own (pre-existing) criteria, and need not filter variants out of the playlist based on outside criteria or restrict itself to certain options. Additionally, because the Pruned Master Playlist 145 is cached at each level, the system can rapidly respond to requests from other Client Devices 105 that include the same Flag 130. That is, the system does not re-generate the Pruned Master Playlist 145 each time the Flag 130 is detected. This further reduces the overhead of the system.

Figure 2:
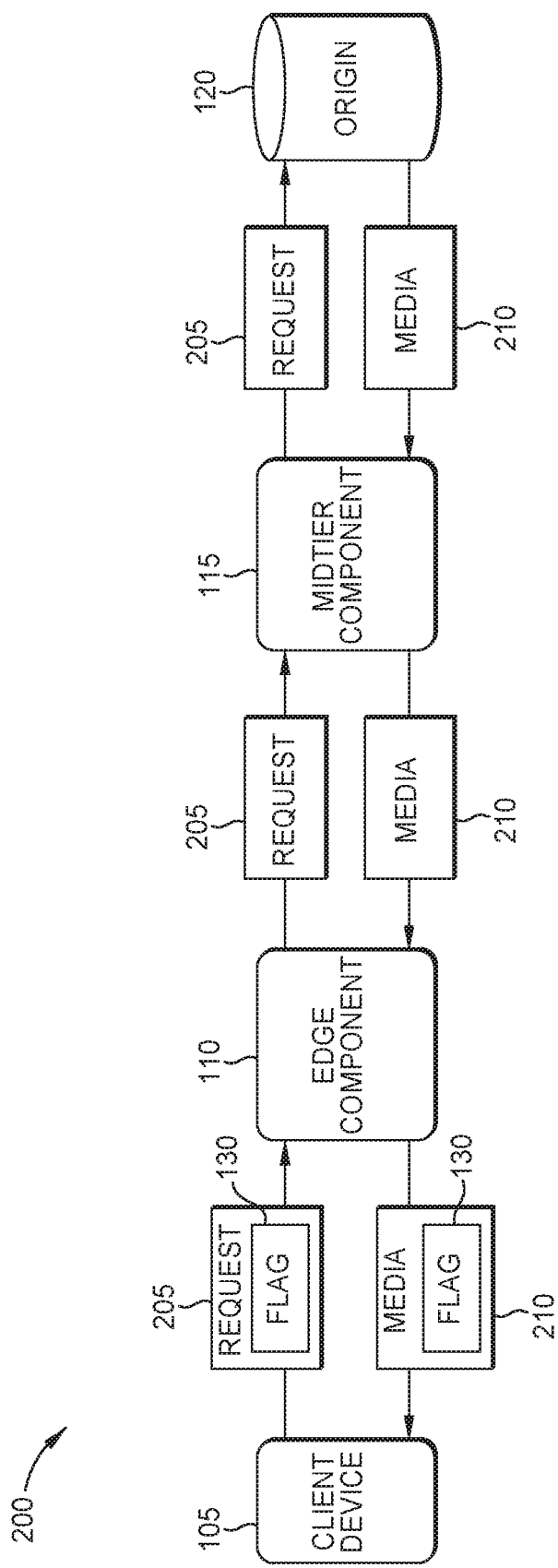
FIG. 2 depicts a workflow for media retrieval and storage, according to some embodiments disclosed herein.

FIG. 2 depicts a workflow 200 for media retrieval and storage, according to some embodiments disclosed herein. In some embodiments, the workflow 200 occurs after the Client Device 105 has retrieved a playlist (e.g., based on the workflow 100) In the illustrated embodiment, the Client Device 105 transmits a Request 205, which may include a Flag 130, for a media segment. In embodiments, the Client Device 105 generally selects, from the master playlist (or pruned master playlist), which variant (e.g., which bitrate) to consume. The Client Device 105 can then request the corresponding media segments sequentially. For example, the playlist may list multiple variants for each media segment (e.g., a high definition or high bandwidth variant, a mid-definition or mid-bandwidth variant, and a low definition or low bandwidth variant). In embodiments, the Request 205 generally specifies the location or address of the desired segment or content. The Flag 130 can be included or excluded based on the configuration of the Client Device 105, as discussed above. Similar to the above discussion about with respect to the playlist, each component (e.g., the Edge Component 110 and the Midtier Component 115) can check their respective local caches for the requested segment prior to forwarding the Request 205 to the next component in the hierarchy. This can generally reduce latency and network congestion by using local copies of the segment when possible, rather than re-downloading a new one for each request.

In the illustrated embodiment, the Edge Component 110 strips the Flag 130 from the Request 205. In embodiments, the Edge Component 110 searches its local storage/cache for the requested segment without respect to the Flag 130. That is, in the illustrated embodiment, the media segments are stored without reference to any Flags 130 or other restrictions. In this way, a given segment cached at the Edge Component 110 can be returned to any requesting Client Device 105, regardless of the particular limitations (indicated by the Flags 130) relevant to the Client Device 105. In this way, the caching system can continue to operate efficiently, despite the presence of such restrictions and Pruned Master Playlists 145.

If the requested media segment is not available locally, the Edge Component 110 forwards the Request 205 to the Midtier Component 115. As illustrated, in some embodiments, this Request 205 does not include the Flag 130. As discussed above, the media segments can generally be identified and returned without reference to the restrictions/Flags 130. The Midtier Component 115 can then similarly evaluate its local cache to serve the requested media segment. If the segment is not available locally, the Midtier Component 115 then forwards the Request 205 to the Origin 120. The Origin 120, in response, provides the requested Media 210. The Midtier Component 115 then forwards the Media 210 to the Edge Component 110. In some embodiments, the Midtier Component 115 additionally caches the media segment locally. In embodiments, this cached Media 210 does not include any reference to the Flag 130.

As illustrated, the Edge Component 110 similarly forwards the Media 210 to the requesting Client Device 105. In the illustrated embodiment, the Edge Component 110 additionally re-attaches the original Flag 130 to the response. The Client Device 105 can then consume the Media 210 (e.g., by outputting it on a display for the end user). In some embodiments, the Edge Component 110 also caches the Media 210 locally, without reference to the Flag 130.

Figure 3:
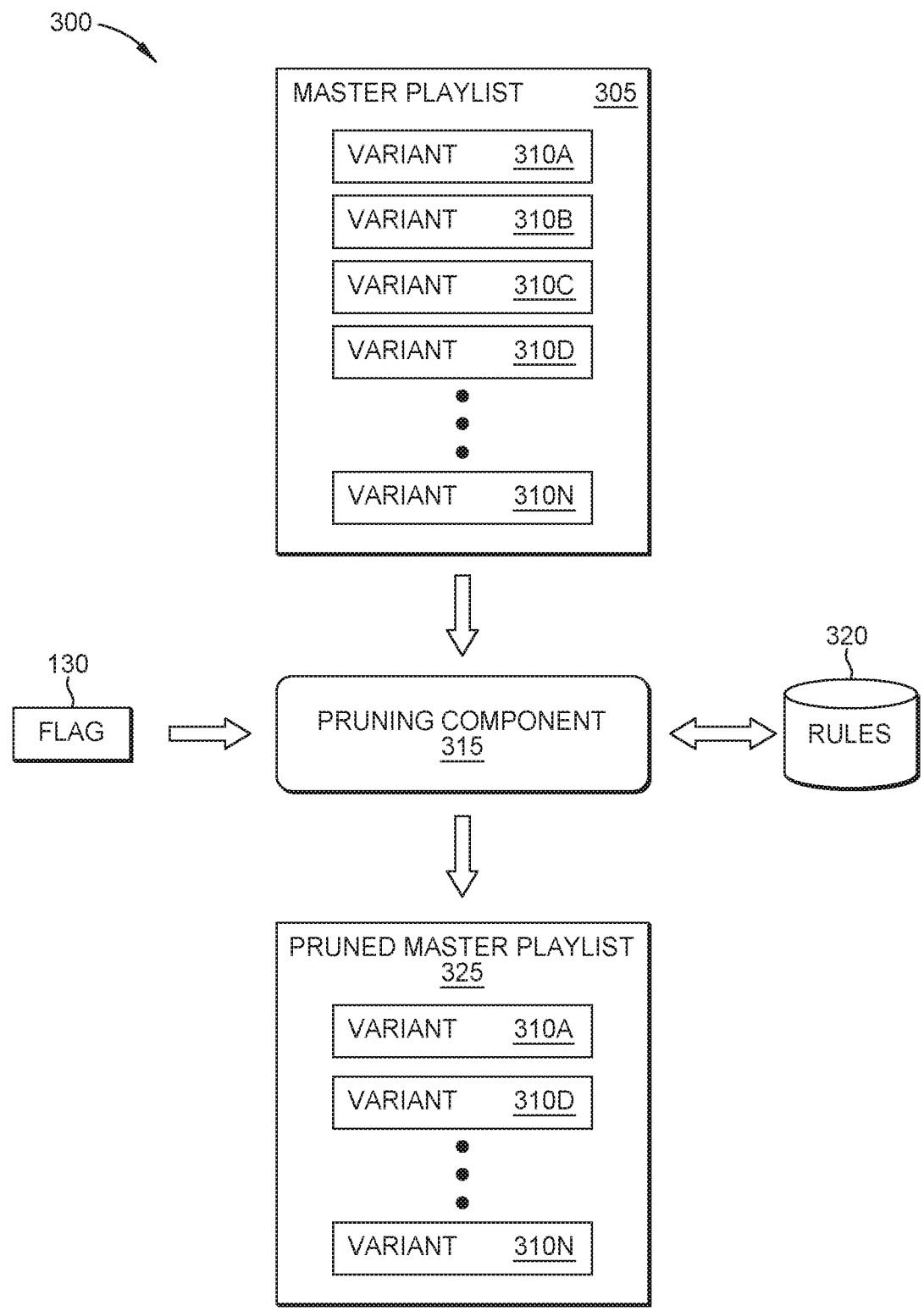
FIG. 3 depicts a workflow for playlist modification utilizing predefined rules, according to some embodiments disclosed herein.

FIG. 3 depicts a workflow 300 for playlist modification utilizing predefined rules, according to some embodiments disclosed herein. In the illustrated embodiment, a Master Playlist 305 is received by a Pruning Component 315 and processed to generate a Pruned Master Playlist 325. As illustrated, the Master Playlist 305 specifies a set of Variants 310A-N. Each Variant 310 corresponds to a version of media that is available from an origin or source. For example, for a given piece of media content (e.g., a movie), there may be a number of alternative Variants 310, each corresponding to a different bitrate, resolution, encoding, frame rate, audio type, subtitles (e.g., with or without subtitles, as well as subtitles of differing language), and the like. In some embodiments, each Variant 310 includes a corresponding sequence of media segments. By referencing the Master Playlist 305, each client device can select and request a Variant 310 that is appropriate for the local conditions (e.g., considering conditions such as computational resources, network availability, and the like). In embodiments, the Master Playlist 305 may include any number of Variants 310 for any number of pieces of media content.

As illustrated, the Pruning Component 315 utilizes one or more predefined Flags 130 to identify a set of corresponding Rules 320 to be applied. In some embodiments, each Flag 130 is a keyword included in the request. In embodiments, each Rule 320 is associated with one or more corresponding Flags 130 (e.g., keywords), indicating that if the Flag 130 is present in a request, the Rule 320 should be used to modify the Master Playlist 305. Thus, using the Flag 130, the Pruning Component 315 can identify the relevant Rules 320. Each Rule 320 generally specifies criteria used to modify or prune the Master Playlist 305. For example, one Rule 320 may indicate that any Variants 310 that include HD video should be removed from the list, while another indicates that Variants 310 that include surround sound (as opposed to stereo or mono audio) should be excluded.

In embodiments, the Rules 320 may include any number and variety of criteria. For example, in various embodiments, a given Rule 320 may specify to prune the Variants 310 based on audio type of the variant (e.g., mono, stereo, or surround sound), the resolution of the variant (e.g., specifying a maximum or minimum allowable resolution), the average bitrate of the variant (e.g., a maximum or minimum target bitrate or bandwidth required to transmit the variant), the frame rate of the variant (e.g., specifying a maximum or minimum allowable frame rate), the particular codec used to encode the variant (e.g., particular audio codecs or video codecs), and the like. In this way, the Rules 320 can be applied to modify the Master Playlist 305 as needed, indicated by the included Flag(s) 130.

As illustrated, the Pruning Component 315 generates a Pruned Master Playlist 325 based on the relevant Rules 320. In the illustrated embodiment, this Pruned Master Playlist 325 still includes Variants 310A, 310D, and 310N. However, Variants 310B and 310C have been removed. Thus, system refrains from offering the Variants 310B and 310C to the requesting Client Device 105, and the Client Device 105 can only select from among the Variants 310A, 310D, and 310N. In various embodiments, there may be any number of Pruned Master Playlists 325 in a given system. As each Pruned Master Playlist 325 is generated using a different set of Rules 320, each Pruned Master Playlist 325 may include and exclude different Variants 310. For example, a first Pruned Master Playlist 325 may exclude any HD or ultra-high definition (UHD) content, while a second excludes both HD (or UHD) content and any content exceeding a predefined framerate.

In this way, the Client Device 105 need not be aware of the particular Rules 320 or restrictions that apply, and can simply select from the indicated set of available Variants 310 using existing techniques. The Client Device 105 need only include appropriate Flags 130 in the request, as controlled by its configuration (e.g., as controlled by the streaming application).

Figure 4:
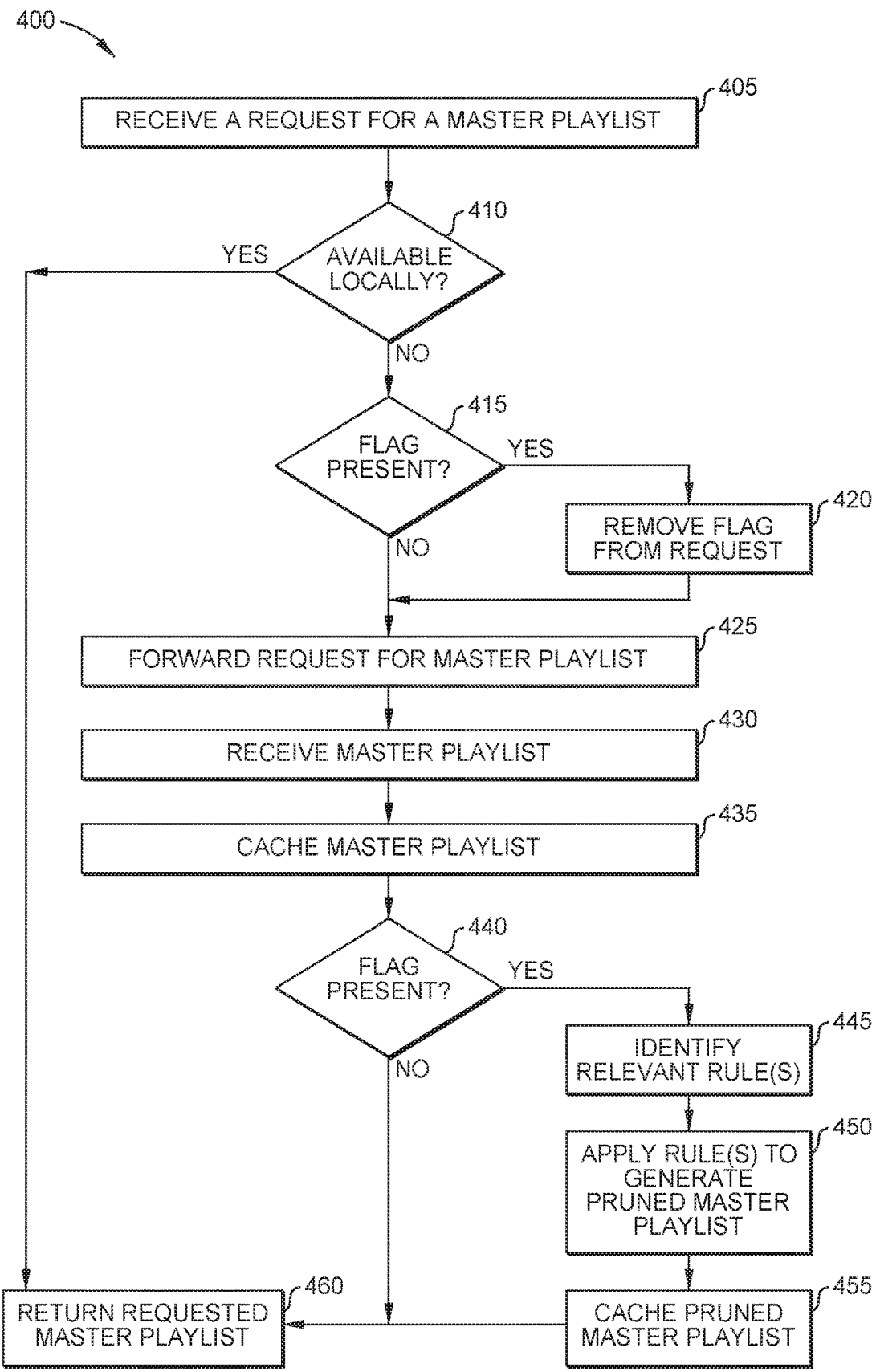
FIG. 4 is a flow diagram depicting a method of processing and modifying playlists based on predefined rules, according to some embodiments disclosed herein.

FIG. 4 is a flow diagram depicting a method 400 of processing and modifying playlists based on predefined rules, according to some embodiments disclosed herein. In embodiments, the method 400 is performed by one or more components in a streaming system or content delivery network (CDN), depending on the particular implementation. For example, in one embodiment, the method 400 is performed by a Midtier Component 115. Although the below discussion refers to a Midtier Component 115 performing the method 400 by way of example, in other embodiments, the method 400 may be performed by an Edge Component 110 or by any other component tasked with generating pruned playlists for the streaming system.

The method 400 begins at block 405, where a Midtier Component 115 receives a request for a playlist. In one embodiment, the request is for a master playlist (also referred to as master manifest in some embodiments). As discussed above, a master playlist generally includes a comprehensive list of available media content (including variants of each piece of media). In contrast, a media playlist or manifest generally corresponds to a particular variant, and specifies the location of each segment of the variant. In embodiments, the request is generally transmitted by a Client Device 105. In various embodiments, the request may be received directly from the Client Device 105 (e.g., with no other streaming components acting as intermediaries) or via one or more intermediary components (e.g., with an Edge Component 110 acting as the intermediary).

In embodiments, the request generally specifies the master playlist that is requested (e.g., using a unique identifier, a unique locator, a unique address, or other similar techniques). At block 410, the Midtier Component 115 determines whether the requested master playlist is available locally. In one embodiment, this includes determining whether the master playlist is located in a storage, memory, or cache that is local to the Midtier Component 115. In some embodiments, as discussed above, the request may include one or more flags or keywords. In one such embodiment, the Midtier Component 115 can determine whether the corresponding modified master playlist is available locally. For example, if the request does not specify any flags, the Midtier Component 115 can determine whether the original/full master playlist is cached. If the request specifies a first flag, the Midtier Component 115 can determine whether the corresponding modified version of the master playlist (e.g., a master playlist that was modified based on the first flag) is cached.

If the requested master playlist is available locally, the method 400 continues to block 460, where the Midtier Component 115 returns the requested playlist. The method 400 then terminates. Returning to block 410, if the requested playlist is not available locally, the method 400 proceeds to block 415. In some embodiments, the master playlist is considered to be unavailable if it is not located in the local cache/storage, or if a predefined timeout has expired (indicating that the Midtier Component 115 should request a new copy of the master playlist). At block 415, the Midtier Component 115 determines whether any predefined flags are present in the request. Each flag generally indicates that the master playlist should be modified in some way (such as by removing one or more variants) prior to returning it to the requesting entity. If no flags are present, the method 400 continues to block 425. If at least one flag is present, the method 400 proceeds to block 420.

At block 420, the Midtier Component 115 removes the identified flag(s) from the request. This allows the Midtier Component 115 to retrieve the full (original) master playlist from the origin. The method 400 then continues to block 425. At block 425, the Midtier Component 115 forwards the requested for the master playlist to the next upstream component (e.g., the Origin 120). In response, the Origin 120 retrieves and transmits the requested (unmodified) master playlist. At block 430, the Midtier Component 115 receives this requested (unmodified) master playlist. At block 435, the Midtier Component 115 then caches the received (unmodified) master playlist locally. This can allow the Midtier Component 115 to operate on and return the unmodified master playlist more rapidly for subsequent requests. In at least one embodiment, if the unmodified master playlist is locally cached but the pruned master playlist for the specific flags is not, the Midtier Component 115 can operate on the cached (original) master playlist, rather than requesting a new copy of the master playlist.

The method 400 then continues to block 440, where the Midtier Component 115 determines whether any flags were included in the original request (received at block 405). If not, the method 400 proceeds to block 460, where the Midtier Component 115 forwards the unmodified master playlist towards the requesting entity. If at least one flag was included in the request, indicating that the master playlist should be modified in some way, the method 400 continues to block 445. At block 445, the Midtier Component 115 identifies a set of one or more rules that correspond to the identified flag(s).

In one embodiment, a set of predefined rules, each specifying one or more associated flags, are utilized to dynamically modify master playlists s as needed. By referring to the flag(s) included in the request, the Midtier Component 115 can identify the set of rule(s) that apply to the request. In embodiments, each rule generally specifies one or more modifications to apply to the master playlist. In some embodiments, these modifications include limitations, restrictions, conditions, or other criteria. For example, a given rule may specify maximum or minimum permissible resolutions for variants to be included in the master playlist (where resolutions failing to meet the specified criteria are removed from the master playlist), maximum or minimum frame rates, maximum or minimum bitrates or average bitrates, allowed or disallowed codecs, allowed or disallowed audio types, and the like. Of course, in embodiments, any number and variety of criteria can be utilized, and embodiments of the present disclosure are not limited to these enumerated examples.

Once the set of relevant rules has been identified, the method 400 continues to block 450 where the Midtier Component 115 applies the identified rule(s) to generate a pruned master playlist. In some embodiments, as discussed above, this includes removing one or more variants that fail to satisfy the predefined rules (or removing variants that do satisfy the rules). In some embodiments, a given modification may not result in any variants being removed (e.g., if no variants violate the constraint). Additionally, although removing variants is discussed as one example modification, in embodiments, any other modifications can be used consistently with this disclosure.

Once the pruned master playlist (also referred to as a modified playlist in some embodiments) has been created, the Midtier Component 115 caches or stores it locally for subsequent use. In at least one embodiment, the Midtier Component 115 associates this modified master playlist with an indication of the flag(s) used to create it. In this way, when future requests are received, the Midtier Component 115 can evaluate the included flag(s) in the subsequent requests in order to determine whether a corresponding modified master playlist is already available in the cache. This allows the Midtier Component 115 to serve dynamically-generated modified master playlists s without requiring the system to re-generate the modified master playlists s for each request or each client. The method 400 then proceeds to block 460, where the Midtier Component 115 returns the requested (modified) master playlist.

Figure 5:
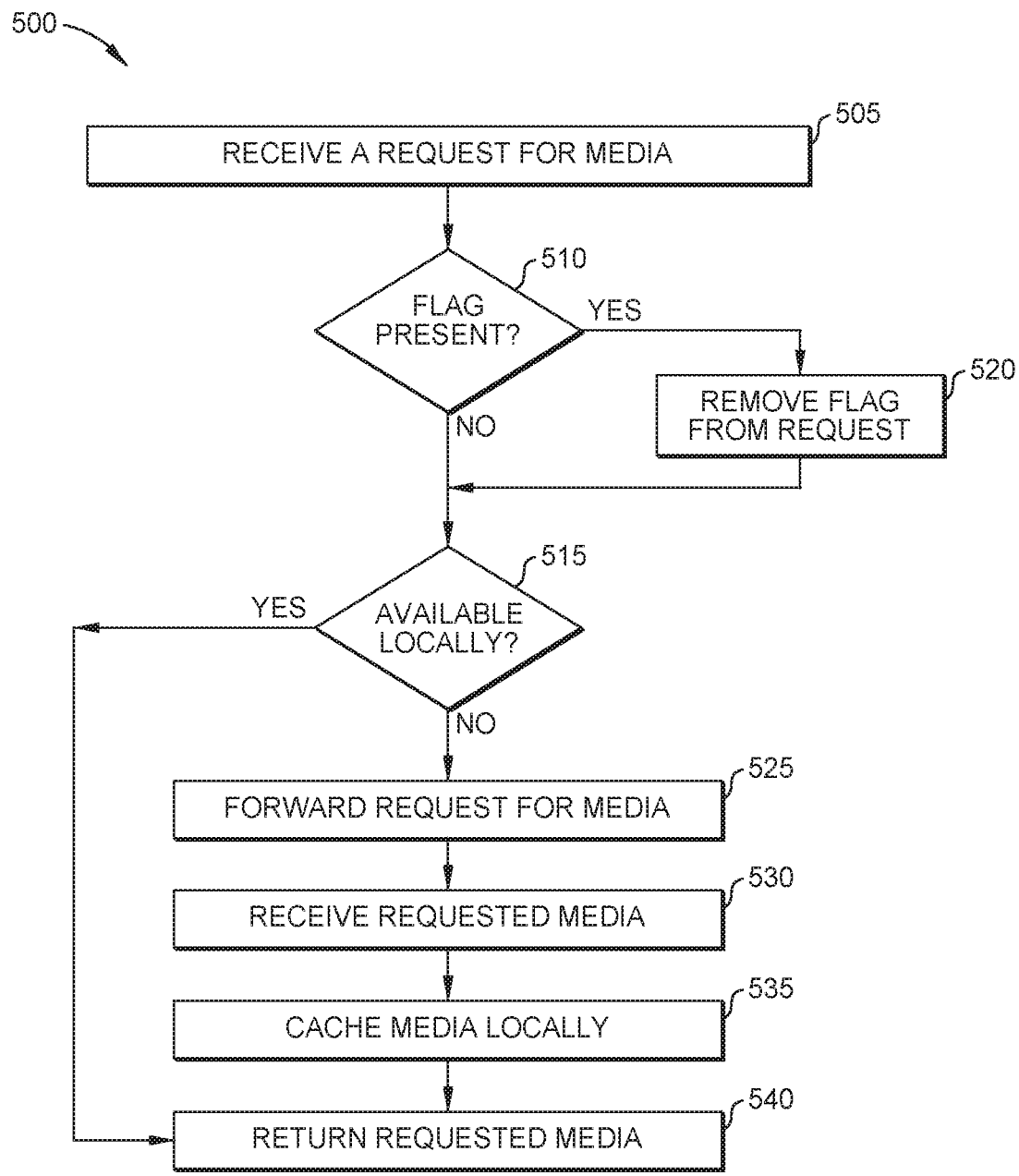
FIG. 5 is a flow diagram depicting a method of retrieving media, according to some embodiments disclosed herein.

FIG. 5 is a flow diagram depicting a method 500 of retrieving media. In embodiments, the method 500 is performed by one or more components in a streaming system or content delivery network (CDN), depending on the particular implementation. For example, in one embodiment, the method 500 is performed by an Edge Component 110. Although the below discussion refers to an Edge Component 110 performing the method 500 by way of example, in other embodiments, the method 500 may be performed by a Midtier Component 115 or by any other component. In embodiments, the method 500 is performed in order to retrieve and return media segments to client devices that have already retrieved a master playlist (which may, in fact, be a pruned or modified playlist). In the illustrated embodiment, the particular keyword(s) utilized by a given client can be ignored once the playlist has been provided. That is, although the client may include the keyword(s) when requesting media, the media is cached and retrieved without reference to the keyword(s). This allows the same media segments to be shared between clients that are using different keywords.

The method 500 begins at block 505, where an Edge Component 110 receives a request for media (e.g., a segment of media) from a Client Device 105. In some embodiments, the request specifies an identifier used to retrieve the media or media segment (e.g., a unique identifier, address, location, or other similar identifier). In embodiments, the Client Device 105 identifies the media (or media segment) using a master playlist (or modified master playlist). As discussed above, by utilizing dynamically-modified master playlists, the streaming system can proactively influence the actions of each client device (e.g., by limiting the available options), and thereby reduce congestion in the overall network.

At block 510, the Edge Component 110 determines whether the request includes one or more flags. If not, the method 500 continues to block 515. In one embodiment, the presence (or absence) of flags indicates whether the client device is currently subject to any restrictions or limitations, as discussed above. For example, based on the identity of the client device, the end user, the location of the device, the network the device is utilizing for communications, and the like, the system can impose dynamic modifications to help maintain efficient communications in the network.

If there is at least one flag present in the request, the method 500 continues to block 520 where the Edge Component 110 removes the flag. That is, in retrieving and returning media (or media segments), the streaming system does not consider the flags or restrictions that are applied. Instead, the system retrieves the requested segment and returns it without reference to the flags. This allows the system to reuse cached media for any client device, irrespective of the specific limitations relevant to each. At block 515, the Edge Component 110 determines whether the media or segment is available locally (e.g., in a local cache). If so, the method 500 proceeds to block 540, where the Edge Component 110 returns the requested media (or media segment).

If the requested media is not available locally, the method 500 continues to block 525, where the Edge Component 110 forwards the media request to one or more other components (e.g., to a Midtier Component 115 or to the Origin 120). In embodiments, this forwarded request does not include any flags or keywords. At block 530, the Edge Component 110 receives the requested media from the upstream component(s). The method 500 then proceeds to block 535, where the Edge Component 110 caches or otherwise stores the media locally. In embodiments, this cached media (or media segment) does not include any reference or link to the flag(s), if any, that were included in the request. In this way, the cached media can be used for any subsequent client or request. At block 540, the Edge Component 110 returns the requested media (or media segment) the requesting entity.

Figure 6:
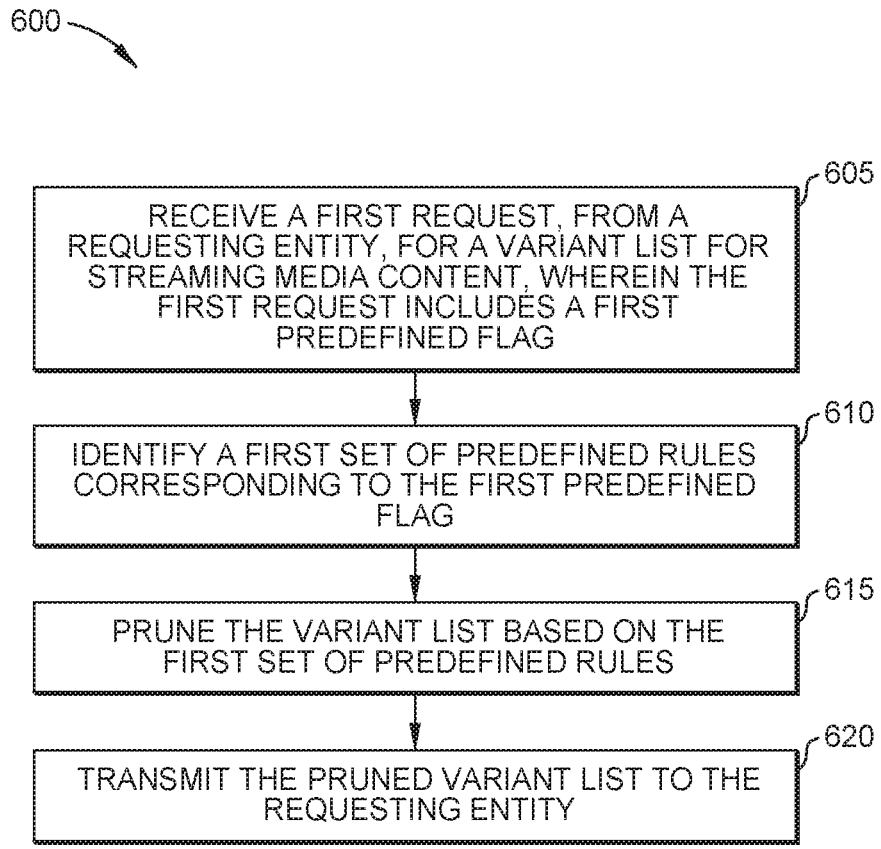
FIG. 6 is a flow diagram depicting a method of processing and modifying playlists based on predefined rules, according to some embodiments disclosed herein.

FIG. 6 is a flow diagram depicting a method 600 of processing and modifying variant lists based on predefined rules, according to some embodiments disclosed herein. The method 600 begins at block 605, where a streaming system (e.g., a midtier component) receives a first request, from a requesting entity, for a variant list for streaming media content, wherein the first request includes a first predefined flag. At block 610, the streaming system identifies a first set of predefined rules corresponding to the first predefined flag. The method 600 then continues to block 615, where the streaming system prunes the variant list based on the first set of predefined rules. Further, at block 620, the streaming system transmits the pruned variant list to the requesting entity.

Figure 7:
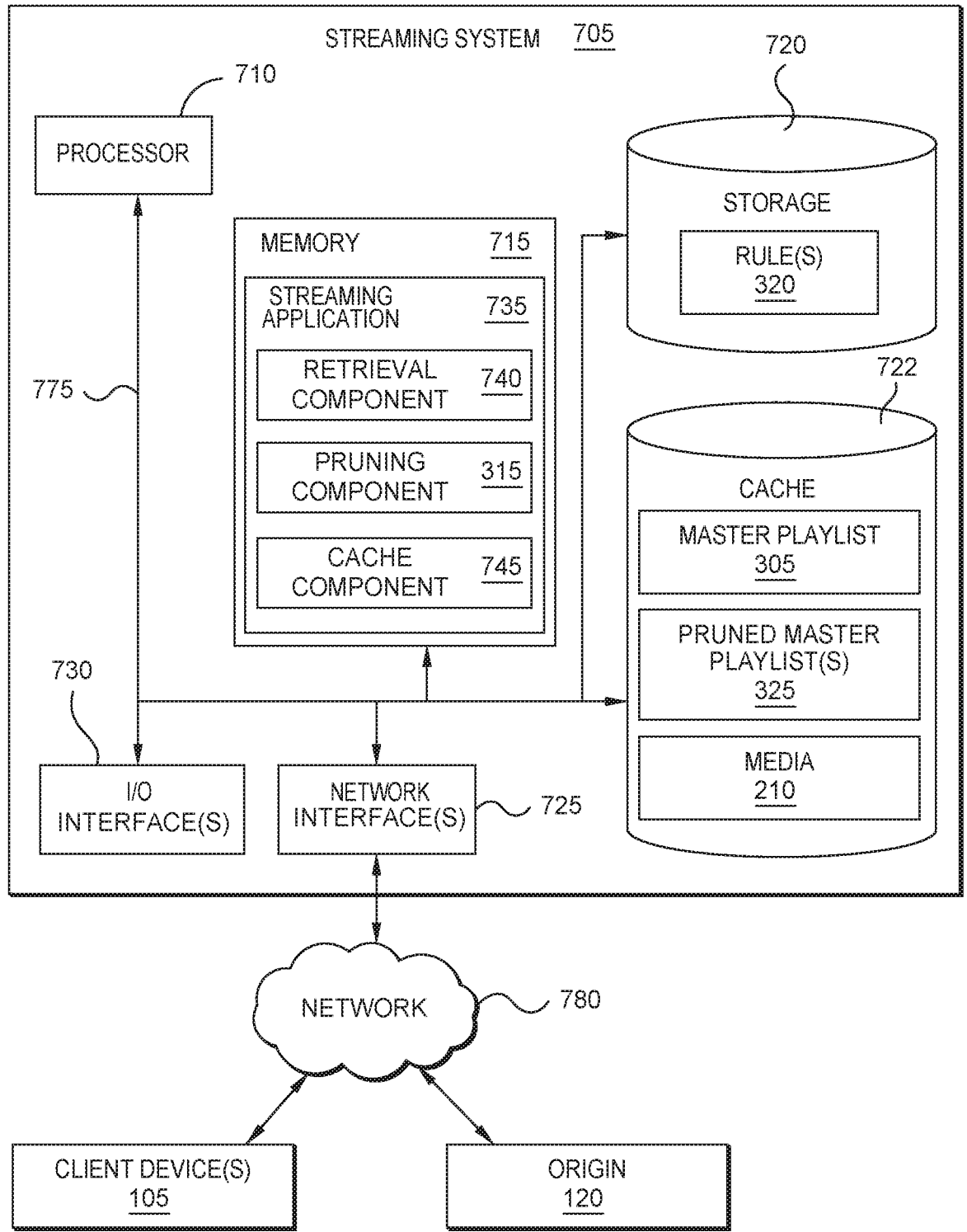
FIG. 7 is a block diagram depicting a streaming system configured to process and modify playlists based on predefined rules, according to some embodiments disclosed herein.

FIG. 7 is a block diagram depicting a Streaming System 705 configured to process and modify playlists based on predefined rules, according to some embodiments disclosed herein. In one embodiment, the Streaming System 705 corresponds to a midtier component. In another embodiment, the Streaming System 705 is an edge component. In still another embodiment, the Streaming System 705 can act as both an edge component and a midtier component. Although depicted as a physical device, in embodiments, the Streaming System 705 may be implemented as a virtual device or service, or across a number of devices (e.g., in a cloud environment). As illustrated, the Streaming System 705 includes a Processor 710, Memory 715, Storage 720, a Cache 722, a Network Interface 725, and one or more I/O Interfaces 730. In the illustrated embodiment, the Processor 710 retrieves and executes programming instructions stored in Memory 715, as well as stores and retrieves application data residing in Storage 720. The Processor 710 is generally representative of a single CPU, a GPU, a CPU and a GPU, multiple CPUs, multiple GPUs, a single CPU or GPU having multiple processing cores, and the like. The Memory 715 is generally included to be representative of a random access memory. Storage 720 and Cache 722 may be any combination of memory or storage components, including (but not limited to) disk drives, flash-based storage devices, and the like, and may include fixed storage devices, removable storage devices or a combination both, such as fixed disk drives, removable memory cards, caches, optical storage, network attached storage (NAS), or storage area networks (SAN).

In some embodiments, input and output devices (such as a mouse, a keyboard, a monitor, a touchscreen, etc.) are connected via the I/O Interface(s) 730. Further, via the Network Interface 725, the Streaming System 705 can be communicatively coupled with one or more other devices and components (e.g., directly or via the Network 780, which may include the Internet, local network(s), and the like). Additionally, the Network 780 may include wired connections, wireless connections, or a combination of wired and wireless connections. In the illustrated embodiment, the Streaming System 705 is communicatively coupled with one or more Client Devices 105 and one or more Origins 120. As illustrated, the Processor 710, Memory 715, Storage 720, Cache 722, Network Interface(s) 725, and I/O Interface(s) 730 are communicatively coupled by one or more Buses 775. In embodiments, the Streaming System 705 may be implemented as a standalone device, as part of a broader deployment, and the like.

In the illustrated embodiment, the Storage 720 includes a set of Rules 320. Although depicted as residing in Storage 720, the Rules 320 may be stored in any suitable location. In embodiments, the Rules 320 generally relate to modifications that can be applied to playlists. For example, the Rules 320 may each specify limitations or restrictions on the variants that are to be included or excluded from a given master playlist when the Rule 320 is applied.

In the illustrated embodiment, the Cache 722 includes a Master Playlist 305, a set of one or more Pruned Master Playlists 325, and Media 210. Although depicted as residing in Cache 722, the Master Playlist 305, Pruned Master Playlists 325, and Media 210 may reside in any suitable location. Similarly, in embodiments, the Master Playlist 305, Pruned Master Playlists 325, or Media 210 may be unavailable in the Cache 722 at any given time. The Master Playlist 305 is an unmodified list of media variants that are available from an Origin 120, as provided by the Origin 120. Using the Master Playlist 305, the specific location or address of each element of media can be determined. The Pruned Master Playlists 325 each correspond to a respective flag (or set of flags), and represent modified versions of the original Master Playlist 305. In embodiments, the Pruned Master Playlists 325 are generated by applying one or more Rules 320 to remove variants from the Master Playlist 305. The Media 210 generally includes media segments that are cached by the Streaming System 705 in order to facilitate rapid delivery of content.

In the illustrated embodiment, the Memory 715 includes a Streaming Application 735. The Streaming Application 735 is generally configured to perform one or more of the embodiments discussed herein. Although depicted as software residing in Memory 715, in embodiments, the functionality of the Streaming Application 735 may be implemented using software, hardware, or a combination of software and hardware. As illustrated, the Streaming Application 735 includes a Retrieval Component 740, a Pruning Component 315, and a Cache Component 745. Although depicted as discrete components for conceptual clarity, in embodiments, the operations of the Retrieval Component 740, Pruning Component 315, and Cache Component 745 may be combined or distributed across any number of components and devices.

In an embodiment, the Retrieval Component 740 receives requests from Client Devices 105 or other components. These requests can include media requests (e.g., requests to deliver one or more segments of Media 210), playlist requests (e.g., requests to deliver a Master Playlist 305 or Pruned Master Playlist 325), and the like. In embodiments, the Retrieval Component 740 evaluates each request to determine whether one or more flags are included. In one embodiment, if the request is for Media 210, the Retrieval Component 740 can remove and discard the flag(s), if present, and proceed to retrieve the relevant Media 210 without reference to the flags. In some embodiments, if the request is for a playlist, the Retrieval Component 740 determines whether to return the unmodified Master Playlist 305 or a Pruned Master Playlist 325 based on the flag(s) present, if any.

In some embodiments, the Retrieval Component 740 first searches the Cache 722 for the requested content (either a playlist or Media 210). If the content is available in the Cache 722, the Retrieval Component 740 returns this cached data. If the requested content is not available locally, as discussed above, the Retrieval Component 740 can transmit or forward the request to an upstream component (e.g., the Origin 120). In at least one embodiment, the Retrieval Component 740 removes any flag(s) included in the request prior to forwarding it.

When the requested content is returned by the upstream component, in one embodiment, the Cache Component 745 stores a copy of it in the Cache 722. For example, if an unmodified Master Playlist 305 is returned, the Cache Component 745 can store the updated copy in the Cache 722 for future use. Similarly, if Media 210 is returned, the Cache Component 745 can cache it in the Cache 722 to reduce delay for subsequent requests for the same Media 210.

In the illustrated embodiment, if the original request was for a playlist and one or more flag(s) were included, the Pruning Component 315 determines the modifications to apply by identifying the corresponding Rules 320 associated with the identified flag(s). The Pruning Component 315 can then apply each such Rule 320 (e.g., by removing one or more variants from the Master Playlist 305) in order to generate a Pruned Master Playlist 325. This Pruned Master Playlist 325 can similarly be stored in the Cache 722 (e.g., by the Cache Component 745).

The requested content (e.g., the Master Playlist 305, Pruned Master Playlist 325, or Media 210) can then be returned to the requesting entity.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
receiving a first request, from a requesting entity, for a variant list for streaming media content, wherein the first request includes a first predefined flag corresponding to a keyword included in a path, specified in the first request, for the variant list;
removing the first predefined flag from the first request;
retrieving the variant list by transmitting the first request, without the first predefined flag, to an upstream component;
identifying a first set of predefined rules corresponding to the first predefined flag;
generating a pruned variant list by pruning the variant list based on the first set of predefined rules; and
transmitting the pruned variant list, rather than the variant list, to the requesting entity.

2. The method of claim 1, further comprising:
storing the variant list in a cache for subsequent requests; and
storing the pruned variant list in the cache for subsequent requests.

3. The method of claim 2, further comprising:
receiving a second request for the variant list, wherein the second request includes the first predefined flag; and
upon determining that the pruned variant list is cached:
returning the pruned variant list from the cache without generating a new pruned variant list.

4. The method of claim 2, further comprising:
receiving a second request for the variant list, wherein the second request includes a second predefined flag; and
identifying a second set of predefined rules based on the second predefined flag; and
generating a second pruned variant list by modifying the variant list based on the second set of predefined rules, wherein the pruned variant list includes at least one variant that is excluded from the second pruned variant list.

5. The method of claim 1, further comprising requesting an updated copy of the variant list from a content provider in response to receiving the first request.

6. The method of claim 1, wherein the pruned variant list is returned to an edge device in communication with a client device, and wherein the edge device is configured to:
receive a second request for a first segment, wherein the second request includes the first predefined flag;
remove the first predefined flag from the second request; and
retrieve the first segment based on the second request.

7. The method of claim 1, wherein the variant list specifies a plurality of variants that are available for media, and wherein the first set of predefined rules specify to remove at least one of the plurality of variants in order to generate the pruned variant list.

8. The method of claim 7, wherein the first set of predefined rules specify to remove variants from the plurality of variants based on one or more of: (i) an audio type of each variant, (ii) a resolution of each variant, (iii) an average bitrate of each variant, (iv) a frame rate of each variant, or (v) a codec used to encode each variant.

9. A non-transitory computer-readable medium containing computer program code that, when executed by operation of one or more computer processors, performs an operation comprising:
receiving a first request, from a requesting entity, for a variant list for streaming media content, wherein the first request includes a first predefined flag corresponding to a keyword included in a path, specified in the first request, for the variant list;
removing the first predefined flag from the first request;
retrieving the variant list by transmitting the first request, without the first predefined flag, to an upstream component;
identifying a first set of predefined rules corresponding to the first predefined flag;
generating a pruned variant list by pruning the variant list based on the first set of predefined rules; and
transmitting the pruned variant list, rather than the variant list, to the requesting entity.

10. The non-transitory computer-readable medium of claim 9, the operation further comprising:
storing the variant list in a cache for subsequent requests; and
storing the pruned variant list in the cache for subsequent requests.

11. The non-transitory computer-readable medium of claim 10, the operation further comprising:
receiving a second request for the variant list, wherein the second request includes the first predefined flag; and
upon determining that the pruned variant list is cached:
returning the pruned variant list from the cache without generating a new pruned variant list.

12. The non-transitory computer-readable medium of claim 9, the operation further comprising:
receiving a second request for the variant list, wherein the second request includes a second predefined flag; and
identifying a second set of predefined rules based on the second predefined flag; and
generating a second pruned variant list by modifying the variant list based on the second set of predefined rules, wherein the pruned variant list includes at least one variant that is excluded from the second pruned variant list.

13. The non-transitory computer-readable medium of claim 9, wherein the variant list specifies a plurality of variants that are available for media, and wherein the first set of predefined rules specify to remove at least one of the plurality of variants in order to generate the pruned variant list.

14. The non-transitory computer-readable medium of claim 13, wherein the first set of predefined rules specify to remove variants from the plurality of variants based on one or more of: (i) an audio type of each variant, (ii) a resolution of each variant, (iii) an average bitrate of each variant, (iv) a frame rate of each variant, or (v) a codec used to encode each variant.

15. A system, comprising:
one or more computer processors; and
a memory containing a program which when executed by the one or more computer processors performs an operation, the operation comprising:
receiving a first request, from a requesting entity, for a variant list for streaming media content, wherein the first request includes a first predefined flag corresponding to a keyword included in a path, specified in the first request, for the variant list;
removing the first predefined flag from the first request;
retrieving the variant list by transmitting the first request, without the first predefined flag, to an upstream component;
identifying a first set of predefined rules corresponding to the first predefined flag;
generating a pruned variant list by pruning the variant list based on the first set of predefined rules; and
transmitting the pruned variant list, rather than the variant list, to the requesting entity.

16. The system of claim 15, the operation further comprising:
storing the variant list in a cache for subsequent requests; and
storing the pruned variant list in the cache for subsequent requests.

17. The system of claim 16, the operation further comprising:
receiving a second request for the variant list, wherein the second request includes the first predefined flag; and
upon determining that the pruned variant list is cached:
returning the pruned variant list from the cache without generating a new pruned variant list.

18. The system of claim 15, the operation further comprising:
receiving a second request for the variant list, wherein the second request includes a second predefined flag; and
identifying a second set of predefined rules based on the second predefined flag; and
generating a second pruned variant list by modifying the variant list based on the second set of predefined rules, wherein the pruned variant list includes at least one variant that is excluded from the second pruned variant list.

19. The system of claim 15, wherein the variant list specifies a plurality of variants that are available for media, and wherein the first set of predefined rules specify to remove at least one of the plurality of variants in order to generate the pruned variant list.

20. The system of claim 19, wherein the first set of predefined rules specify to remove variants from the plurality of variants based on one or more of: (i) an audio type of each variant, (ii) a resolution of each variant, (iii) an average bitrate of each variant, (iv) a frame rate of each variant, or (v) a codec used to encode each variant.

* * * * *